US012666295B2

(12) United States Patent
Vohra et al.

(10) Patent No.: US 12,666,295 B2
(45) Date of Patent: Jun. 23, 2026

(54) METHOD TO PRIORITIZE GAPLESS MEASUREMENTS

(71) Applicant: QUALCOMM Incorporated, San Diego, CA (US)

(72) Inventors: Mitul Vohra, Hyderabad (IN); Hitesh Jain, Hyderabad (IN); Sarath Kumar Pujari, Hyderabad (IN); Ansah Ahmed Sheik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/389,100

(22) Filed: Nov. 13, 2023

(65) Prior Publication Data

US 2025/0159513 A1     May 15, 2025

(51) Int. Cl.
*H04W 4/00*          (2018.01)
*H04W 24/08*          (2009.01)
(Continued)

(52) U.S. Cl.
CPC .......... *H04W 24/10* (2013.01); *H04W 24/08* (2013.01); *H04W 76/28* (2018.02); *H04L 1/0026* (2013.01)

(58) Field of Classification Search
None
See application file for complete search history.

(56) References Cited

U.S. PATENT DOCUMENTS

| | | | |
|---|---|---|---|
| 2011/0237202 A1* | 9/2011 | Uemura | ............ H04W 36/0088 |
| | | | 455/67.14 |
| 2012/0003943 A1* | 1/2012 | Marinier | ............... H04W 76/27 |
| | | | 455/73 |

(Continued)

FOREIGN PATENT DOCUMENTS

WO          2023130307 A1     7/2023

OTHER PUBLICATIONS

3GPP TS 38.133: "9 Measurement Procedure", 3GPP Draft, Draft_38133-l20, 3rd Generation Partnership Project, Mobile Competence Centre, 650, Route Des Lucioles, F-06921 Sophia-Antipolis Cedex, France, Jun. 19, 2023, V18.2.0, XP052511138, 298 Pages, p. 1, lines 4-6 p. 139, lines 1-3, paragraph 9.3.9.3 p. 127, lines 3-4 p. 127, lines 1-5, paragraph 9.3.1.

(Continued)

*Primary Examiner* — Bob A Phunkulh
(74) *Attorney, Agent, or Firm* — ArentFox Schiff, LLP

(57) ABSTRACT

This disclosure provides systems, methods and apparatus, including computer programs encoded on computer storage media for a UE to prioritize gapless measurements. The UE receives an enquiry for capabilities of the UE with respect to a set of bands. The UE determines a portion of the set of bands that can be measured without a measurement gap. The UE indicates a status of the UE to measure all of the bands in the set of bands without a measurement gap when the portion of the set of bands is greater than a first threshold or connected mode discontinuous reception (CDRX) is configured. The UE receives a configuration for inter-band measurements without a measurement gap. The UE transmits a measurement report for inter-band measurements without a measurement for one or more bands that the UE cannot measure without a measurement gap.

30 Claims, 7 Drawing Sheets

(51) Int. Cl.
    *H04W 24/10*         (2009.01)
    *H04W 76/28*         (2018.01)
    *H04L 1/00*          (2006.01)

(56)          References Cited

U.S. PATENT DOCUMENTS

| | | | | |
|---|---|---|---|---|
| 2012/0178465 | A1* | 7/2012 | Lin | H04W 24/10 |
| | | | | 455/450 |
| 2015/0092738 | A1* | 4/2015 | Chakraborty | H04W 72/21 |
| | | | | 370/336 |
| 2015/0312787 | A1* | 10/2015 | Das | H04W 36/0033 |
| | | | | 370/329 |
| 2016/0302230 | A1* | 10/2016 | Novlan | H04L 27/0006 |
| 2018/0110057 | A1* | 4/2018 | Park | H04W 74/0808 |
| 2019/0123803 | A1* | 4/2019 | Raghavan | H04B 7/0695 |
| 2019/0373668 | A1* | 12/2019 | Wang | H04W 16/14 |
| 2022/0007286 | A1* | 1/2022 | Ciftcioglu | H04W 76/28 |
| 2023/0030498 | A1* | 2/2023 | Nickisch | H04L 5/001 |
| 2023/0089794 | A1* | 3/2023 | Behnamfar | H04W 52/367 |
| | | | | 370/329 |
| 2023/0156600 | A1* | 5/2023 | Kang | H04W 52/0232 |
| | | | | 370/318 |
| 2023/0224734 | A1* | 7/2023 | Cui | H04W 24/08 |
| | | | | 370/252 |
| 2023/0269688 | A1* | 8/2023 | Bettappanavar | H04W 24/08 |
| | | | | 370/252 |
| 2024/0007990 | A1* | 1/2024 | Guo | H04W 76/28 |
| 2024/0114403 | A1* | 4/2024 | Latheef | H04W 36/0061 |
| 2024/0114459 | A1* | 4/2024 | Veedu | H04W 76/28 |
| 2024/0187201 | A1* | 6/2024 | Li | H04L 5/0051 |
| 2024/0187901 | A1* | 6/2024 | Cui | H04W 24/10 |
| 2024/0214457 | A1* | 6/2024 | Li | H04W 12/033 |
| 2025/0071589 | A1* | 2/2025 | Cui | H04W 74/0808 |
| 2025/0106903 | A1* | 3/2025 | Abdul Latheef | H04W 52/36 |
| 2025/0168723 | A1* | 5/2025 | Kim | H04W 36/0072 |
| 2025/0175864 | A1* | 5/2025 | Kim | H04W 36/0077 |
| 2025/0211973 | A1* | 6/2025 | Tao | H04B 7/185 |
| 2025/0261064 | A1* | 8/2025 | Kim | H04W 36/08 |
| 2025/0294417 | A1* | 9/2025 | Abdul Latheef | H04W 36/0072 |
| 2025/0310841 | A1* | 10/2025 | Kim | H04W 36/0064 |
| 2025/0317819 | A1* | 10/2025 | Kim | H04W 36/04 |
| 2025/0338161 | A1* | 10/2025 | Zhou | H04L 5/0048 |
| 2025/0386230 | A1* | 12/2025 | Tao | H04W 24/10 |
| 2026/0006527 | A1* | 1/2026 | Abdul Latheef | H04W 36/0055 |
| 2026/0019839 | A1* | 1/2026 | Huang | H04W 24/08 |
| 2026/0020102 | A1* | 1/2026 | Zhou | H04W 76/28 |
| 2026/0025875 | A1* | 1/2026 | Abdul Latheef | H04W 56/0045 |

OTHER PUBLICATIONS

International Search Report and Written Opinion—PCT/US2024/051067—ISA/EPO—Jan. 9, 2025.

\* cited by examiner

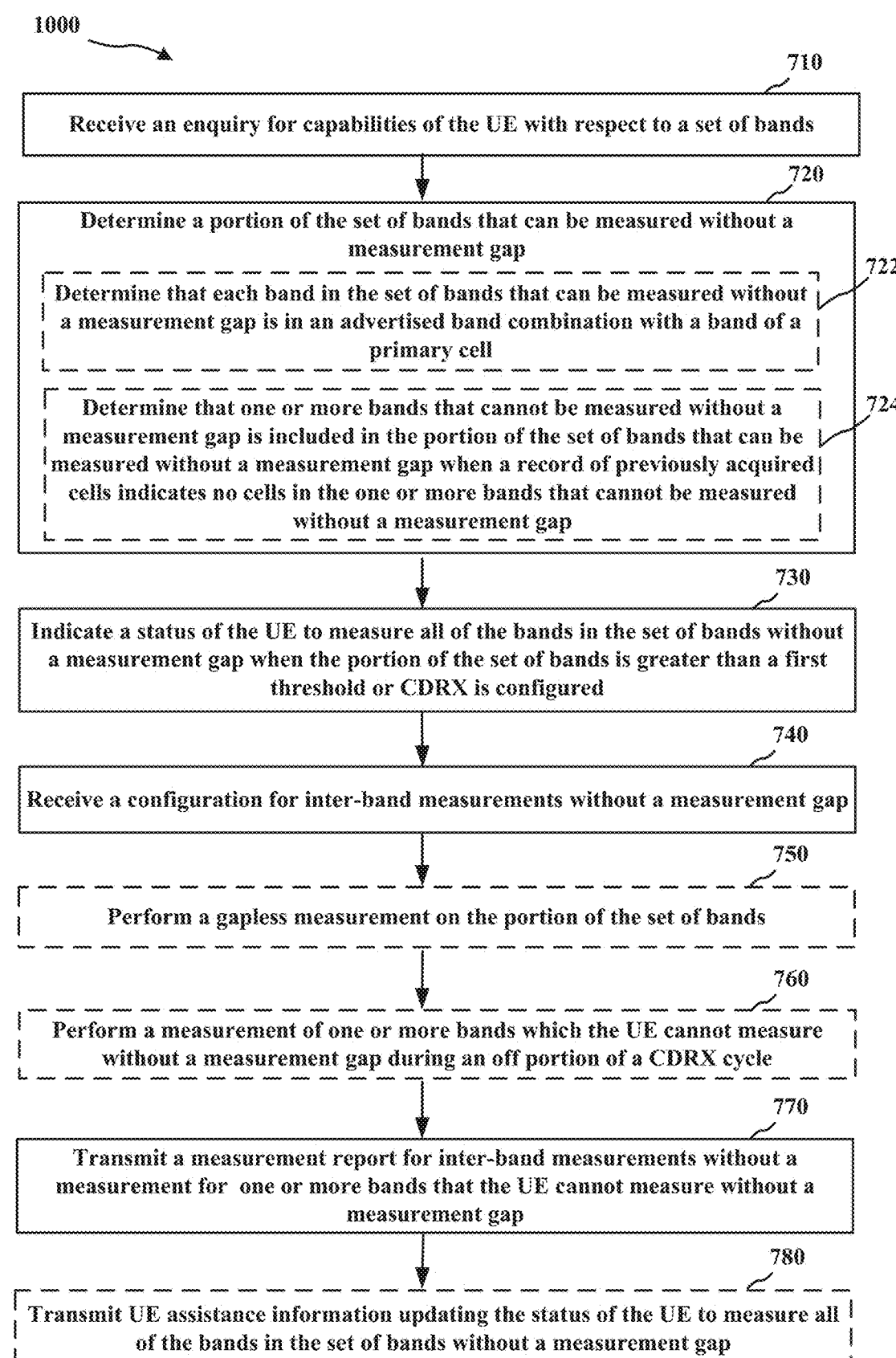

1000

710

Receive an enquiry for capabilities of the UE with respect to a set of bands

720

Determine a portion of the set of bands that can be measured without a measurement gap

722

Determine that each band in the set of bands that can be measured without a measurement gap is in an advertised band combination with a band of a primary cell

724

Determine that one or more bands that cannot be measured without a measurement gap is included in the portion of the set of bands that can be measured without a measurement gap when a record of previously acquired cells indicates no cells in the one or more bands that cannot be measured without a measurement gap

730

Indicate a status of the UE to measure all of the bands in the set of bands without a measurement gap when the portion of the set of bands is greater than a first threshold or CDRX is configured

740

Receive a configuration for inter-band measurements without a measurement gap

750

Perform a gapless measurement on the portion of the set of bands

760

Perform a measurement of one or more bands which the UE cannot measure without a measurement gap during an off portion of a CDRX cycle

770

Transmit a measurement report for inter-band measurements without a measurement for one or more bands that the UE cannot measure without a measurement gap

780

Transmit UE assistance information updating the status of the UE to measure all of the bands in the set of bands without a measurement gap

FIG. 7

METHOD TO PRIORITIZE GAPLESS MEASUREMENTS

TECHNICAL FIELD

The present disclosure relates to wireless communications including inter-band measurements.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

In some aspects, the techniques described herein relate to a method of wireless communications at a user equipment (UE), the method including: receiving an enquiry for capabilities of the UE with respect to a set of bands; determining a portion of the set of bands that can be measured without a measurement gap; indicating a status of the UE to measure all of the bands in the set of bands without a measurement gap when the portion of the set of bands is greater than a first threshold or connected mode discontinuous reception (CDRX) is configured; receiving a configuration for inter-band measurements without a measurement gap; and transmitting a measurement report for inter-band measurements without a measurement for one or more bands that the UE cannot measure without a measurement gap.

In some aspects, the techniques described herein relate to an apparatus for wireless communications at a user equipment (UE), including: one or more memories, individually or in combination, storing computer-executable instructions; and one or more processors, individually or in combination, configured to execute the instructions to: receive an enquiry for capabilities of the UE with respect to a set of bands; determine a portion of the set of bands that can be measured without a measurement gap; indicate a status of the UE to measure all of the bands in the set of bands without a measurement gap when the portion of the set of bands is greater than a first threshold or connected mode discontinuous reception (CDRX) is configured; receive a configuration for inter-band measurements without a measurement gap; and transmit a measurement report for inter-band measurements without a measurement for one or more bands that the UE cannot measure without a measurement gap.

In some aspects, the techniques described herein relate to an apparatus for wireless communications at a user equipment (UE), the apparatus including: means for receiving an enquiry for capabilities of the UE with respect to a set of bands; means for determining a portion of the set of bands that can be measured without a measurement gap; means for indicating a status of the UE to measure all of the bands in the set of bands without a measurement gap when the portion of the set of bands is greater than a first threshold or connected mode discontinuous reception (CDRX) is configured; means for receiving a configuration for inter-band measurements without a measurement gap; and means for transmitting a measurement report for inter-band measurements without a measurement for one or more bands that the UE cannot measure without a measurement gap.

In some aspects, the techniques described herein relate to a non-transitory computer-readable medium storing computer-executable instructions that when executed by one or more processors of a user equipment (UE) cause the UE to: receive an enquiry for capabilities of the UE with respect to a set of bands; determine a portion of the set of bands that can be measured without a measurement gap; indicate a status of the UE to measure all of the bands in the set of bands without a measurement gap when the portion of the set of bands is greater than a first threshold or connected mode discontinuous reception (CDRX) is configured; receive a configuration for inter-band measurements without a measurement gap; and transmit a measurement report for inter-band measurements without a measurement for one or more bands that the UE cannot measure without a measurement gap.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 is a flowchart of an example method for a UE to perform measurements without a measurement gap.

Like reference numbers and designations in the various drawings indicate like elements.

DETAILED DESCRIPTION

Figure 1:
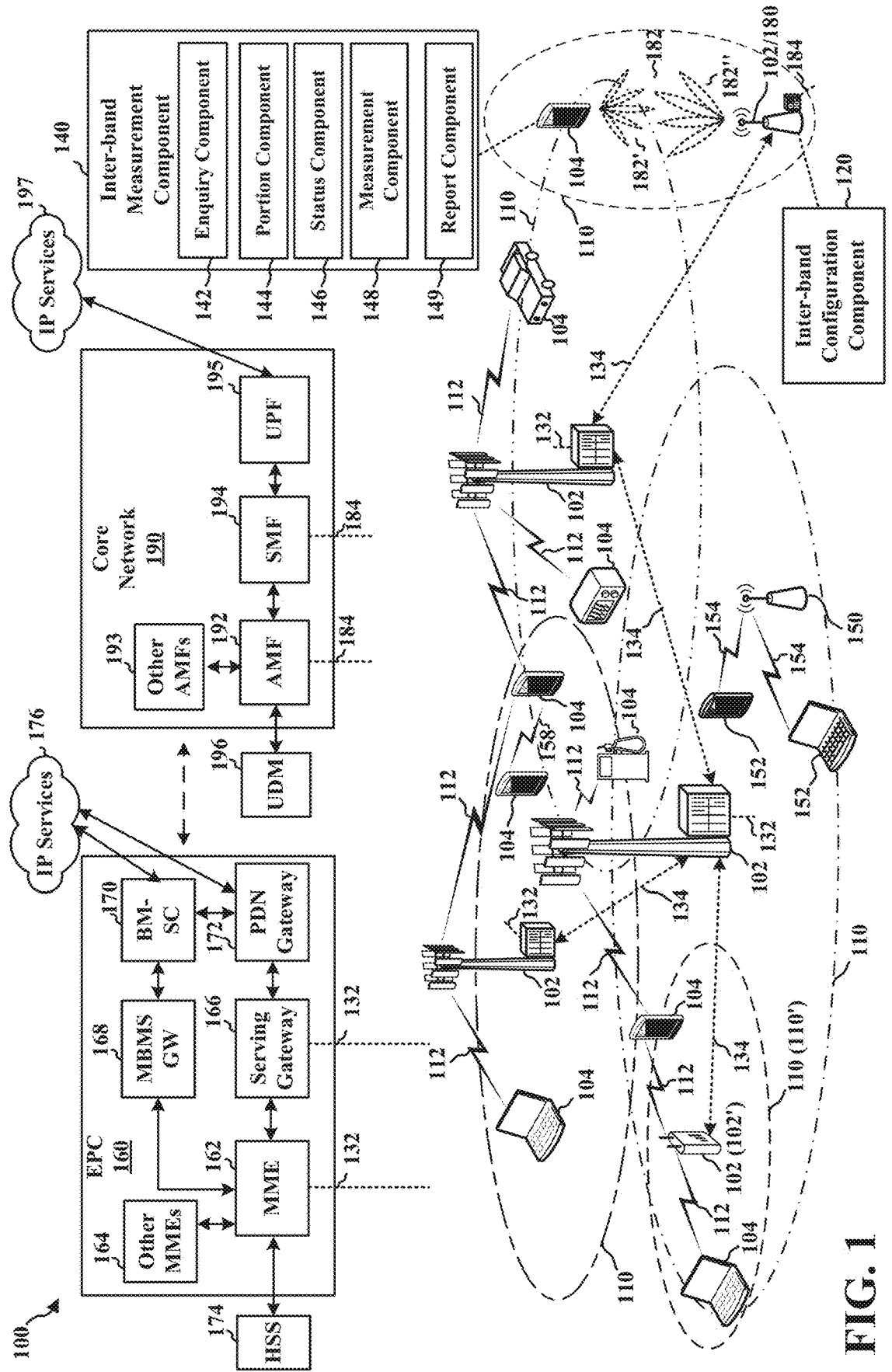
FIG. 1 is a diagram illustrating an example of a wireless communications system including an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

Conventionally, a user equipment (UE) was only able to monitor a single frequency band, for example, because the UE included a single receive chain that was tuned to an active band. In order to perform inter-band measurements on other bands, the UE would be configured with a measurement gap, during which the UE could tune away from the active band to measure a neighbor cell on the other band, then return to the active band.

A UE (e.g., with multiple receive chains) may be capable of monitoring a plurality of frequency bands concurrently. For example, the UE may include multiple receive chains that may be tuned to different frequency bands. Such a UE may be able to perform a gapless measurement where the UE continues to communicate on a first band while concurrently performing a measurement on a second band. In some cases, a UE may support various combinations of bands that can be measured without a gap. The release-16 3GPP standards provide for a mechanism for a UE to indicate which bands require a gap for measurements. The mechanism includes an indication from the UE of whether each band requires a gap. Some networks may configure a UE that indicates a band that requires a gap with measurement gaps for performing measurements. Such measurement gaps may reduce throughput and increase power consumption even when the gaps are not actually needed or are unlikely to identify a suitable neighbor cell.

In an aspect, the present disclosure provides techniques for a UE to report requirements for measurement gaps such that the UE is able to identify suitable neighbor cells with reduced throughput penalties and less power consumption due to measurement gaps. When a UE receives an enquiry regarding capabilities for a set of bands, the UE may determine a portion of the bands that can be measured without a measurement gap. If the portion of the set of bands is greater than a threshold or connected mode discontinuous reception (CDRX) is configured, the UE may indicate that all of the set of bands can be measured without a gap. The UE may then receive a configuration for inter-band measurements without a measurement gap. The UE may prune measurements that the UE cannot perform without a measurement gap. The UE can transmit a measurement report for inter-band measurements without a measurement for one or more bands that the UE cannot measure without a measurement gap. Accordingly, the UE may report measurements without a measurement gap, thereby avoiding throughput loss for the measurement gap and using less power.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUS may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 include an inter-band measurement component 140 configured to perform inter-band measurements without measurement gaps. The inter-band measurement component 140 includes an enquiry component 142, a portion component 144, a status component 146, a measurement component 148, and a report component 149. The enquiry component 142 is configured to receive an enquiry for capabilities of the UE with respect to a set of bands. The portion component 144 is configured to determine a portion of the set of bands that can be measured without a measurement gap. The status component 146 is configured to indicate a status of the UE to measure all of the bands in the set of bands without a measurement gap when the portion of the set of bands is greater than a first threshold or connected mode discontinuous reception (CDRX) is configured. The measurement component 148 is configured to receive a configuration for inter-band measurements without a measurement gap. The report component 149 is configured to transmit a measurement report for inter-band measurements without a measurement for one or more bands that the UE cannot measure without a measurement gap.

In some implementations, one or more of the base stations 102 includes an inter-band configuration component 120 for configuring the UE 104 with measurement objects for inter-band measurements based on the gap information from the UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
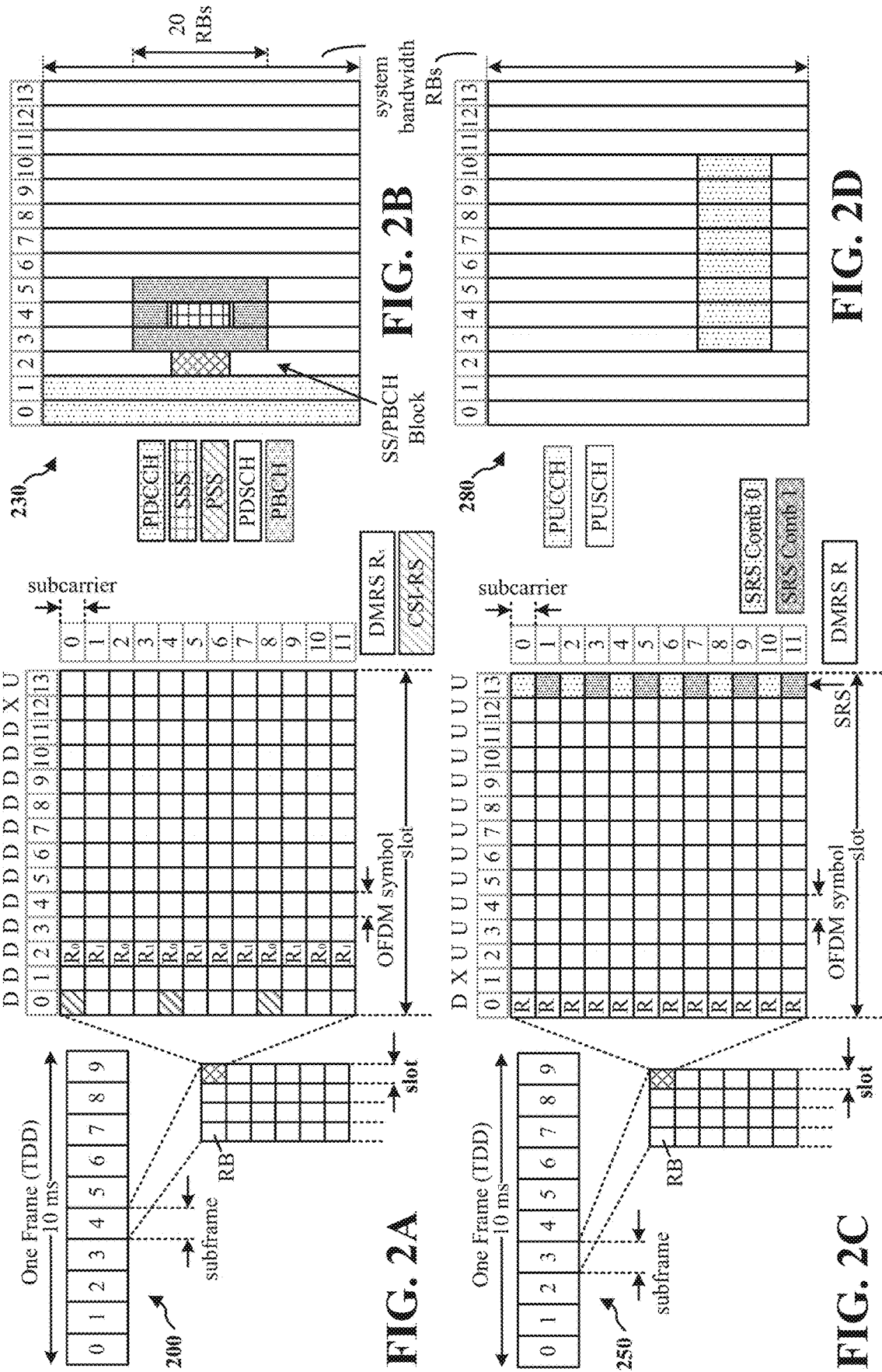
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 24 slots/subframe. The subcarrier spacing and symbol length/duration are a function of the numerology. The subcarrier spacing may be equal to $2^{\mu}*15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a L1 identity. A secondary synchronization signal (SSS) may be within symbol 4 of particular subframes of a frame. The SSS is used by a UE to determine a L1 cell identity group number and radio frame timing. Based on the L1 identity and the L1 cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
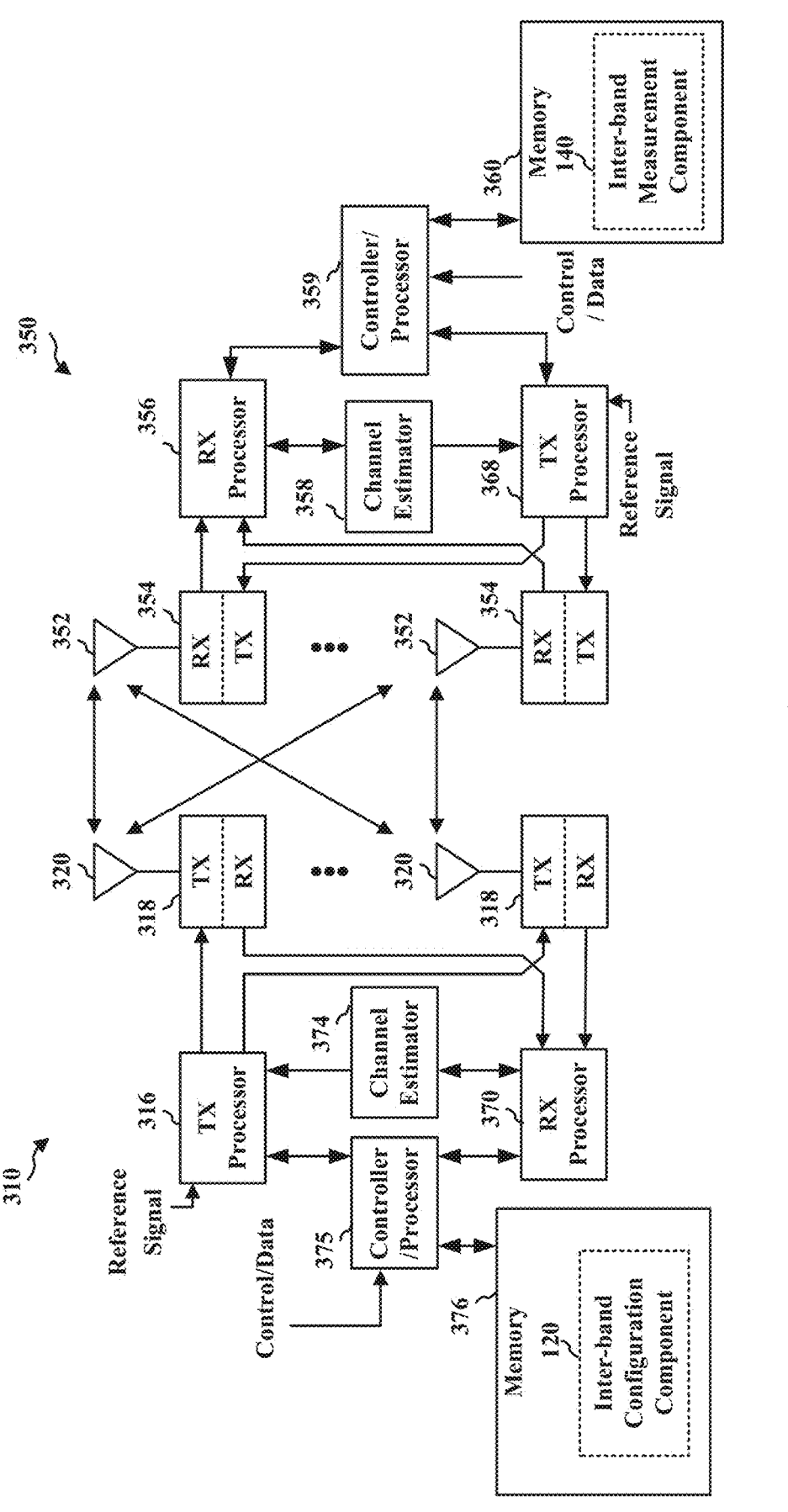
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the inter-band measurement component 140 of FIG. 1. For example, the memory 360 may include executable instructions defining the inter-band measurement component 140. The TX processor 368, the RX processor 356, and/or the controller/processor 359 may be configured to execute the inter-band measurement component 140.

At least one of the TX processor 316, the RX processor 370, and the controller/processor 375 may be configured to perform aspects in connection with the inter-band configuration component 120 of FIG. 1. For example, the memory 376 may include executable instructions defining the inter-band configuration component 120. The TX processor 316, the RX processor 370, and/or the controller/processor 375 may be configured to execute the inter-band configuration component 120.

Figure 4:
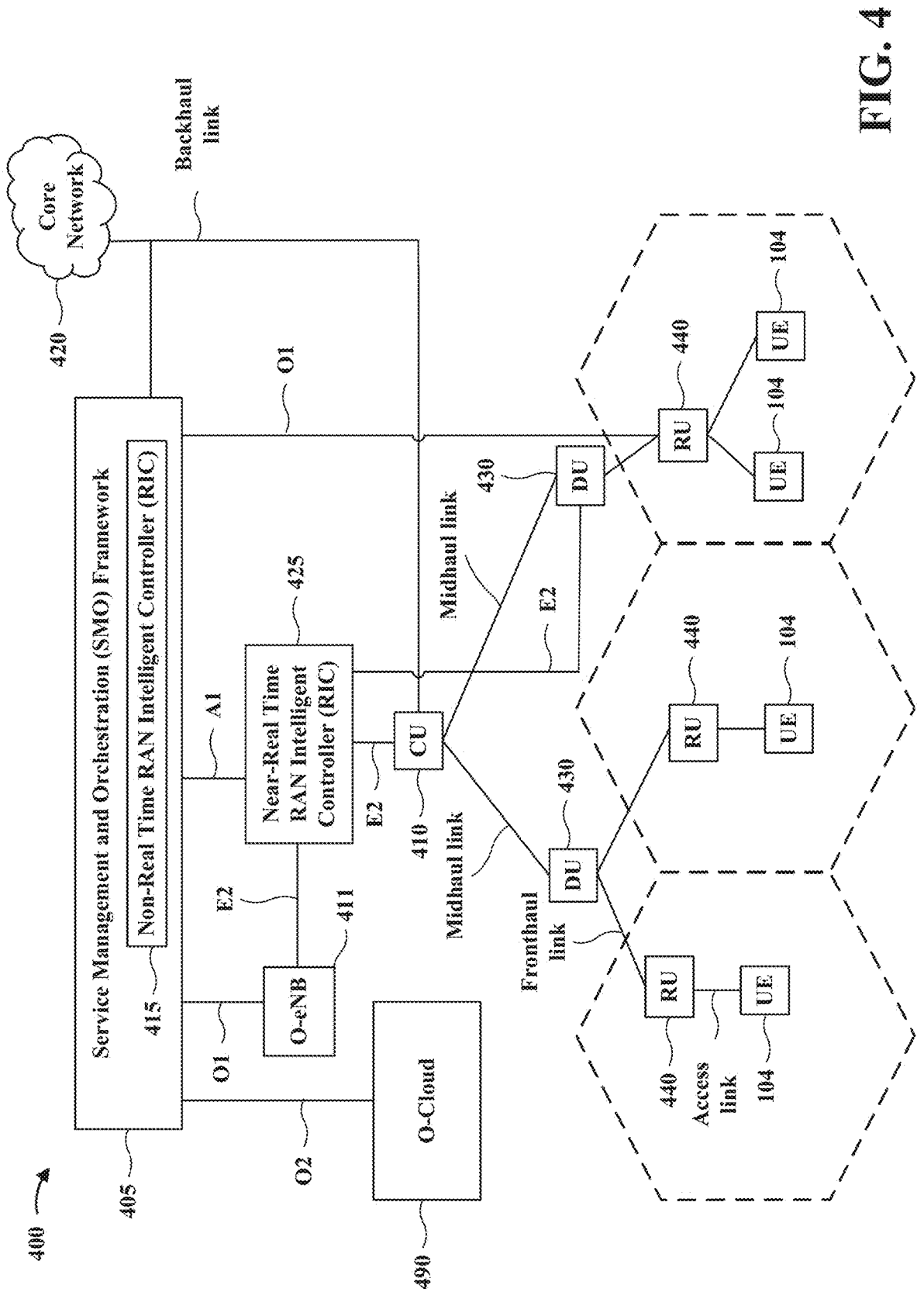
FIG. 4 is a diagram illustrating an example disaggregated base station architecture.

FIG. 4 is a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUS 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
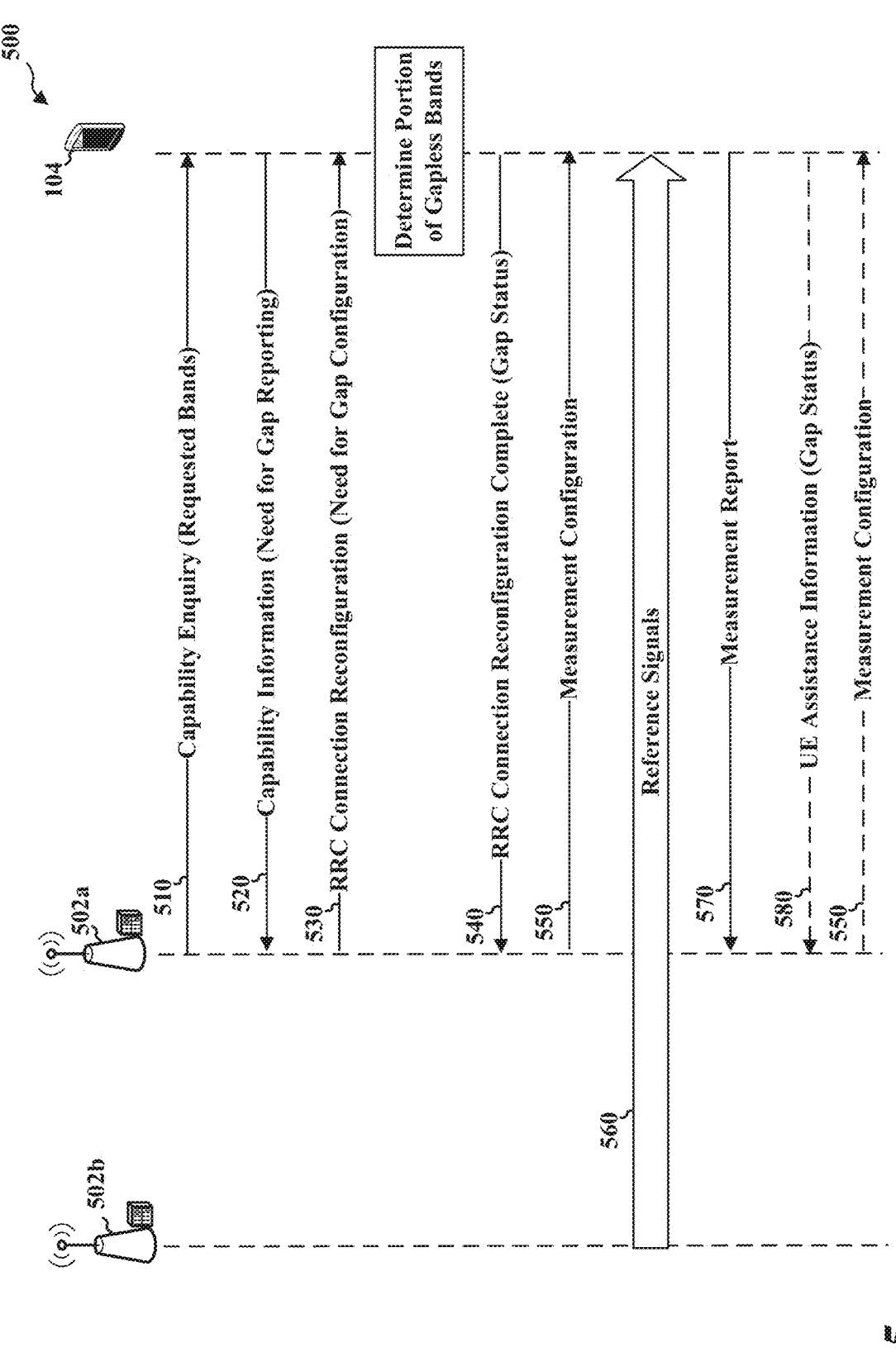
FIG. 5 is a message diagram illustrating various messages for an inter-band measurement reporting procedure.

FIG. 5 is a message diagram illustrating various messages for an inter-band measurement reporting procedure 500. For example, the procedure 500 may be performed by the UE 104 in communication with one or more base stations 502 (e.g., a serving base station 502*a* and an inter-band base station 502*b*), each of which may include an inter-band configuration component 120. Although only two base stations 502 are shown, the procedure 500 is applicable to a larger number of base stations.

A base station 502*a* (e.g., providing a primary serving cell) transmits a capability enquiry 510 to the UE 104. The capability enquiry 510 may be, for example, a RRC message including an indication of requested bands. For example, the RRC message may include an information element that identifies a plurality of frequency bands. For instance, the frequency bands may be bands on which a network operates.

The UE 104 may reply to the capability enquiry 510 with a capability information message 520. The capability information message 520 indicates whether reporting of a need for gaps for inter-band measurements is supported by the UE. For example, the UE 104 with the inter-band measurement component 140 may transmit the capability information message 520 indicating that reporting of a need for gaps for inter-band measurements is supported by the UE 104.

The base station 502*a* transmits a RRC connection reconfiguration message 530. The RRC connection reconfiguration message 530 includes a need for gap configuration that requests the UE to indicate whether the UE needs a measurement gap for each of a set of bands. For instance, the RRC connection reconfiguration message 530 may include a need for gaps configuration information element (IE) such as a NeedForGapsConfigNR IE, NeedForGapNCSG-ConfigEUTRA IE, or NeedForGapNCSG-ConfigNR IE. The RRC connection reconfiguration message 530 may also confirm the band of the serving cell, so the UE 104 may determine whether a measurement gap is needed for measuring the other bands when the UE is connected to the serving cell.

At block 535, the UE 104 may determine a portion of the set of bands that can be measured without a measurement gap. For instance, the portion of the set of bands that can be measured without a measurement gap may be based on advertised band combinations of the UE. If a band is in an advertised band combination with the band of the primary cell, the UE may measure the band without a measurement gap. The band may be considered a gapless band. Otherwise, the band may be considered a gap-based band. In some implementations, the UE 104 may include a record of previously acquired cells. If the UE 104 has never acquired a cell in a frequency band, the UE may consider that band as an unused band. The UE may count an unused band as a gapless band under some conditions. For example, if the portion of gapless bands is less than the first threshold but greater than a second threshold (i.e., a lower threshold), the UE may treat the unused band as a gapless band.

The UE transmits a RRC connection reconfiguration complete message 540. The RRC connection reconfiguration complete message 540 indicates a gap status for each band in the requested set of bands. For instance, the status may be "gap" or "no-gap" for each band. In some implementations, the RRC connection reconfiguration complete message 540 includes a need for gaps info IE such as a NeedForGapsInfoNR IE, a NeedForGapNCSG-InfoEUTRA IE, or a NeedForGapNCSG-InfoNR IE.

In an aspect, under some conditions, the UE 104 may indicate a status of no-gap for all of the bands in the requested set of bands even if the UE cannot actually measure a band without a measurement gap. For example, if the UE is configured with connected-mode discontinuous reception (CDRX), the UE may not need a measurement gap for measuring another band because the UE may perform the measurements during an off portion of a CDRX cycle. As another example, when the UE can measure a threshold portion of the requested bands without a measurement gap, a measurement gap for a small number of bands may not be useful. For instance, the loss of throughput due to measurement gaps may not be worth a chance of identifying a better cell on another band. Accordingly, the UE may indicate that all of the requested bands are gapless bands. In another aspect, if the threshold portion of the requested bands is not met, the UE may report one or more unused bands as a gapless band.

The UE 104 may receive a measurement configuration 550. The measurement configuration 550 may, for example, define measurement objects for the UE to measure and measurement gaps if needed to measure the measurement objects. In an aspect, the measurement configuration 550 may not indicate any measurement gaps in response to the RRC connection reconfiguration complete message 540 indicating the status of the UE to measure all of the bands in the set of bands without a measurement gap.

The base stations 502 transmit reference signals 560. The UE 104 is configured to measure the reference signals 560 based on the measurement configuration 550. The UE 104 actually measures the portion of the set of bands that can be measured without a measurement gap by performing a gapless measurement on the portion of the set of bands. When there is at least one band that the UE 104 cannot measure without a measurement gap, the UE 104 may prune that measurement. That is, the UE may not tune to the other band and may not detect a cell. Accordingly, the UE may act as if the measurement had been performed and the reference signal 560 was not detected. In cases where the UE 104 is configured with CDRX, the UE may perform a measurement of one or more bands which the UE cannot measure without a measurement gap during an off portion of the CDRX cycle.

The UE 104 may transmit a measurement report 570. The measurement report 570 may be for inter-band measurements. The measurement report 570 may not include a measurement for one or more bands that the UE cannot measure without a measurement gap. For example, the measurement report 570 may include a list of best detected cells. The UE 104 may not include any cells for bands that the UE did not measure.

In some implementations, the UE 104 may transmit UE assistance information 580. The UE assistance information 580 may provide an update to the status of the UE. For instance, the UE assistance information 580 may be transmitted without an RRC connection reconfiguration. For example, a power status of the UE 104 may change, for example, by entering a low-power mode in which one or more receive chains are powered down. Accordingly, the ability of the UE to use the receive chains for gapless measurements may change. The UE assistance information 580 may allow the UE 104 to update the status of gapless measurements. In some implementations, the serving base station 502a may transmit another measurement configuration 550 in response to the UE assistance information 580.

Figure 6:
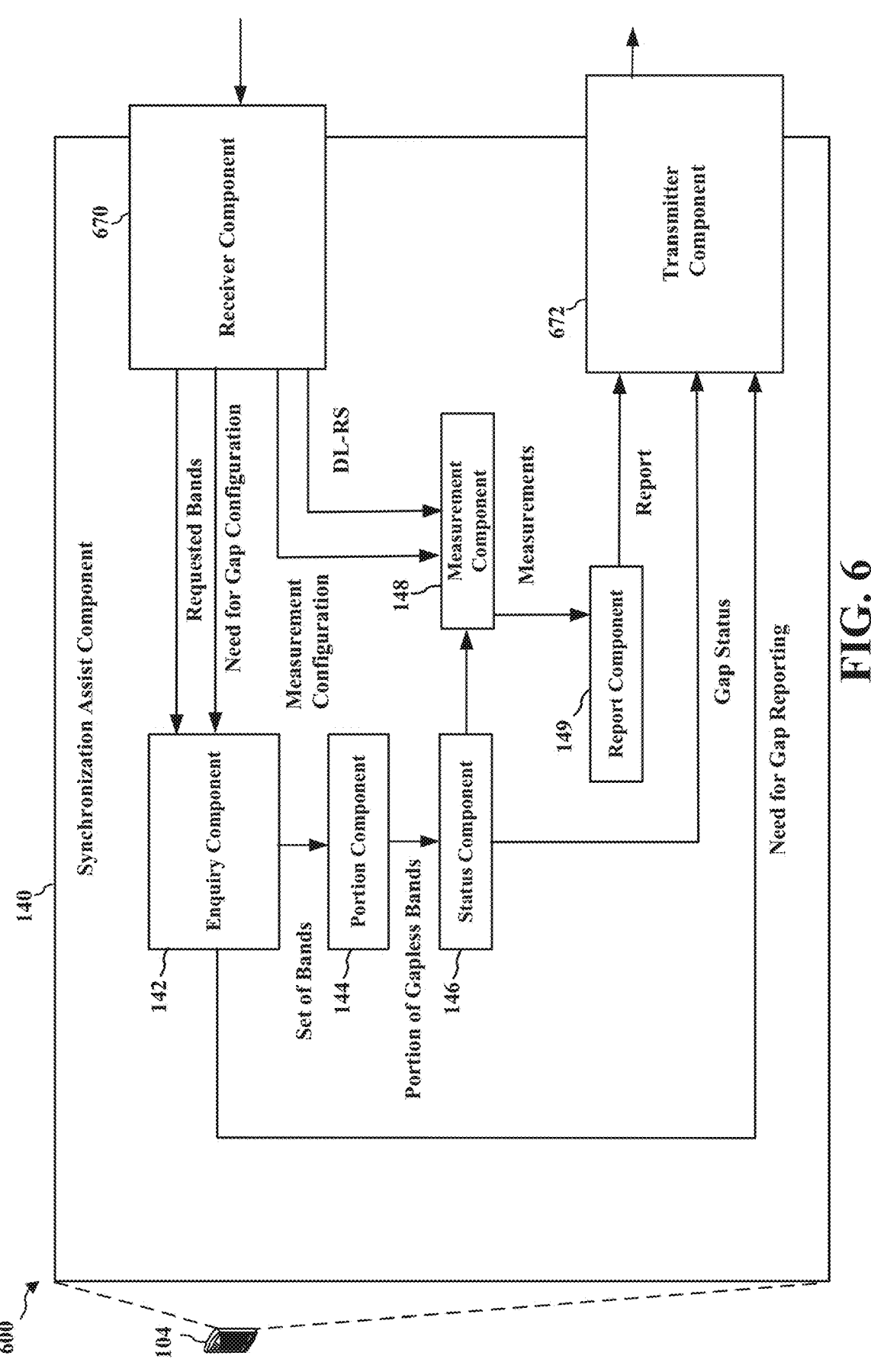
FIG. 6 is a conceptual data flow diagram illustrating the data flow between different means/components in an example UE.

FIG. 6 is a conceptual data flow diagram 600 illustrating the data flow between different means/components in an example UE 104, which may be an example of the UE 104 (FIG. 1) and include the inter-band measurement component 140. The inter-band measurement component 140 may be implemented by the memory 360 and the TX processor 368, the RX processor 356, and/or the controller/processor 359. For example, the memory 360 may store executable instructions defining the inter-band measurement component 140 and the TX processor 368, the RX processor 356, and/or the controller/processor 359 may execute the instructions.

The UE 104 may include a receiver component 670, which may include, for example, a RF receiver for receiving the signals described herein. The UE 104 may include a transmitter component 672, which may include, for example, an RF transmitter for transmitting the signals described herein. In an aspect, the receiver component 670 and the transmitter component 672 may co-located in a transceiver such as the TX/RX 352 in FIG. 3.

As discussed with respect to FIG. 1, the inter-band measurement component 140 includes the enquiry component 142, the portion component 144, the status component 146, the measurement component 148, and the report component 149.

The receiver component 670 may receive DL signals described herein such as the capability enquiry 510, the RRC connection reconfiguration message 530, the measurement configuration 550, and the reference signals 560. The receiver component 670 may output the capability enquiry 510 and the RRC connection reconfiguration message 530 to the enquiry component 142. The receiver component 670 may output the measurement configuration 550 and the reference signals 560 to the measurement component 148.

The enquiry component 142 is configured to receive an enquiry for capabilities of the UE with respect to a set of bands. For example, the enquiry component 142 may receive the capability enquiry 510 including requested bands from the receiver component 670. The enquiry component 142 may indicate a need for gap reporting in the capability information message 520, which the enquiry component 142 may output for transmission via the transmitter component 672. The enquiry component 142 may then receive an RRC connection reconfiguration message 530 including a need for gap configuration information element from the receiver component 670. The RRC connection reconfiguration message 530 and/or the need for gap configuration information element may indicate a set of bands. The enquiry component 142 may output the set of bands to the portion component 144.

The portion component 144 is configured to determine a portion of the set of bands that can be measured without a measurement gap. For example, the portion component 144 may receive an indication of the set of bands from the enquiry component 142. In some implementations, the portion component 144 may determine whether each band in the set of bands that can be measured without a measurement gap based on an advertised band combination with a band of a primary cell. That is, the portion component 144 may determine whether each band in the set of bands is advertised in a band combination with the band of the primary cell. If so, the band may be considered a gapless band. If the band is not advertised, the band may be considered a gap-based band. In some implementations, the portion component 144 may determine the portion of gapless bands (e.g., as a percentage) of the set of bands. In some implementations, the portion component 144 may determine whether the portion of gapless bands satisfies a first threshold. For instance, the first threshold may be based on a confidence level of being able to find another suitable cell. For instance, the first threshold may be 70%. In some implementations, for example, where the portion of gapless bands does not satisfy the first threshold, the portion component 144 may determine whether any bands are unused bands where the UE 104 has not previously acquired a cell. In some implementations, any unused bands may be considered gapless bands because measuring such bands is unlikely to result in a measurement of a suitable cell. Accordingly, the portion component 144 may determine that one or more bands that cannot be measured without a measurement gap (gap-based bands) is included in the portion of the set of bands that can be measured without a measurement gap (gapless bands) when a record of previously acquired cells indicates no cells in the one or more bands (unused bands) that cannot be measured without a measurement gap. In some implementations, the portion component 144 may consider the unused bands when the portion of the set of bands that can be measured without a measurement gap (gapless bands) is less than the first threshold but greater than a second threshold (e.g., 60%), and the portion of the set of bands that can be measured without a measurement gap (gapless bands) plus the one or more bands that cannot be measured without a measurement gap without a record of previously acquired cells (unused bands) is greater than the first threshold. The portion component 144 outputs the portion of gapless bands to the status component 146. For example, the portion of gapless bands may be each gapless band, the percentage of gapless bands, or whether a number of percentage of gapless bands satisfies a threshold.

The status component 146 is configured to indicate a status of the UE to measure all of the bands in the set of bands without a measurement gap when the portion of the set of bands is greater than a first threshold or CDRX is configured. The status component 146 receives the portion of gapless bands from the portion component 144. The status component 146 may compare the portion of gapless bands to the first threshold to determine whether to indicate a status of the UE to measure all of the bands in the set of bands. When the portion of gapless bands is greater than the first threshold, the likelihood of a suitable cell being found on a gap-based band is lower, and the costs of measurement gaps (e.g., lower throughput) may be excessive for the low likelihood of finding an additional suitable cell. Accordingly, the status component 146 may indicate that all of the bands are gapless bands to avoid being configured with a measurement gap. For example, the status component may output the RRC connection reconfiguration complete message 540 with a gap status indicating no gap for each of the set of bands for transmission by the transmitter component 672. The status component 146 may also output the gap status for each band to the measurement component 148. In some implementations, the status component 146 may update the gap status. For example, the status component 146 may output the UE assistance information 580 including a gap status for transmission via the transmitter component 672. For instance, the status component 146 may update the gap status in response to entering or leaving a power saving mode or a low mobility mode.

The measurement component 148 is configured to receive a configuration for inter-band measurements without a measurement gap. For example, the measurement component 148 may receive a measurement configuration 550 via the receiver component 670. For instance, the measurement configuration 550 may include a RRC message specifying a measurement object and/or a MAC-CE that activates a measurement object. In some implementations, the measurement component 148 is further configured to measure one or more bands. For instance, the measurement component 148 may perform a gapless measurement on the portion of the set of bands that can be measured without a measurement gap. A gapless measurement may include continuing to monitor the band of the serving cell while concurrently performing a measurement on a different band. For instance, the measurement component 148 may use a second receive chain to perform the measurement on the different band. In some implementations, the measurement component 148 may perform a measurement of one or more bands which the UE cannot measure without a measurement gap during an off portion of a CDRX cycle. For example, during the off portion of the CDRX cycle the UE does not expect to receive any transmissions from the serving cell, so the receive chain may be tuned away to a gap-based band to perform a measurement. Accordingly, a measurement gap is not needed, even if the receive chain for the serving cell is used to perform the measurement during the CDRX off period. The measurement component 148 outputs the measurements to the report component 149.

The report component 149 is configured to transmit a measurement report for inter-band measurements without a measurement for one or more bands that the UE cannot measure without a measurement gap. The report component 149 receives the measurements from the measurement component 148. The report component 149 may format the measurement report 570 based on the measurement configuration 450. For example, the report component 149 may include a best measured cell or a ranked list of measured cells based on the measurement configuration 450. In an aspect, where the measurement component 148 does not measure a gap-based band, the measurement report 570 will not include a measurement for the gap-based band. The report component 149 may output the measurement report 570 for transmission by the transmitter component 572.

FIG. 7 is a flowchart of an example method 700 for a UE to perform measurements without a measurement gap. The method 700 may be performed by a UE (such as the UE 104, which may include the memory 360 and which may be the entire UE 104 or a component of the UE 104 such as the inter-band measurement component 140, TX processor 368, the RX processor 356, or the controller/processor 359). The method 700 may be performed by the inter-band measurement component 140 in communication with the inter-band configuration component 120 of one or more base stations 102. Optional blocks are shown with dashed lines.

At block 710, the method 700 includes receiving an enquiry for capabilities of the UE with respect to a set of bands. In some implementations, for example, the UE 104, the RX processor 356 or the controller/processor 359 may execute the inter-band measurement component 140 or the enquiry component 142 to receive an enquiry for capabilities of the UE with respect to a set of bands. Accordingly, the UE 104, the RX processor 356, or the controller/processor 359 executing the inter-band measurement component 140 or the enquiry component 142 may provide means for receiving an enquiry for capabilities of the UE with respect to a set of bands.

At block 720, the method 700 includes determining a portion of the set of bands that can be measured without a measurement gap. In some implementations, for example, the UE 104, the RX processor 356 or the controller/processor 359 may execute the inter-band measurement component 140 or the portion component 144 to determine a portion of the set of bands that can be measured without a measurement gap. In some implementations, at sub-block 722, the block 720 may optionally include determining that each band in the set of bands that can be measured without a measurement gap is in an advertised band combination with a band of a primary cell. In some implementations, at sub-block 724, the block 720 may optionally include determining that one or more bands that cannot be measured without a measurement gap is included in the portion of the set of bands that can be measured without a measurement gap when a record of previously acquired cells indicates no cells in the one or more bands that cannot be measured without a measurement gap. Accordingly, the UE 104, the RX processor 356, or the controller/processor 359 executing the inter-band measurement component 140 or the portion component 144 may provide means for determining a portion of the set of bands that can be measured without a measurement gap.

At block 730, the method 1000 includes indicating a status of the UE to measure all of the bands in the set of bands without a measurement gap when the portion of the set of bands is greater than a first threshold or CDRX is configured. In some implementations, for example, the UE 104, the TX processor 368 or the controller/processor 359 may execute the inter-band measurement component 140 or the status component 146 to indicate a status of the UE to measure all of the bands in the set of bands without a measurement gap when the portion of the set of bands is greater than a first threshold or CDRX is configured. Accordingly, the UE 104, the TX processor 368, or the controller/processor 359 executing the inter-band measurement component 140 or the status component 146 may provide means for indicating a status of the UE to measure all of the bands in the set of bands without a measurement gap when the portion of the set of bands is greater than a first threshold or CDRX is configured.

At block 740, the method 700 includes receiving a configuration for inter-band measurements without a measurement gap. In some implementations, for example, the UE 104, the RX processor 356 or the controller/processor 359 may execute the inter-band measurement component 140 or the measurement component 148 to receive a configuration for inter-band measurements without a measurement gap. Accordingly, the UE 104, the RX processor 356, or the controller/processor 359 executing the inter-band measurement component 140 or the measurement component 148 may provide means for receiving a configuration for inter-band measurements without a measurement gap.

At block 750, the method 700 may optionally include perform a gapless measurement on the portion of the set of bands. In some implementations, for example, the UE 104, the RX processor 356 or the controller/processor 359 may execute the inter-band measurement component 140 or the measurement component 148 to perform a gapless measurement on the portion of the set of bands. Accordingly, the UE 104, the RX processor 356, or the controller/processor 359 executing the inter-band measurement component 140 or the measurement component 148 may provide means for performing a gapless measurement on the portion of the set of bands.

At block 760, the method 700 may optionally include performing a measurement of one or more bands which the UE cannot measure without a measurement gap during an off portion of a CDRX cycle. In some implementations, for example, the UE 104, the RX processor 356 or the controller/processor 359 may execute the inter-band measurement component 140 or the measurement component 148 to perform a measurement of one or more bands which the UE cannot measure without a measurement gap during an off portion of a CDRX cycle. Accordingly, the UE 104, the RX processor 356, or the controller/processor 359 executing the inter-band measurement component 140 or the measurement component 148 may provide means for performing a measurement of one or more bands which the UE cannot measure without a measurement gap during an off portion of a CDRX cycle.

At block 770, the method 1000 includes transmitting a measurement report for inter-band measurements without a measurement for one or more bands that the UE cannot measure without a measurement gap. In some implementations, for example, the UE 104, the TX processor 368 or the controller/processor 359 may execute the inter-band measurement component 140 or the report component 149 to transmit a measurement report for inter-band measurements without a measurement for one or more bands that the UE cannot measure without a measurement gap. Accordingly, the UE 104, the TX processor 368, or the controller/processor 359 executing the inter-band measurement component 140 or the report component 149 may provide means for transmitting a measurement report for inter-band measurements without a measurement for one or more bands that the UE cannot measure without a measurement gap.

At block 780, the method 700 may optionally include transmitting UE assistance information updating the status of the UE to measure all of the bands in the set of bands without a measurement gap. In some implementations, for example, the UE 104, the TX processor 368 or the controller/processor 359 may execute the inter-band measurement component 140 or the status component 146 to transmit UE assistance information updating the status of the UE to measure all of the bands in the set of bands without a measurement gap. Accordingly, the UE 104, the TX processor 368, or the controller/processor 359 executing the inter-band measurement component 140 or the status component 146 may provide means for transmitting UE assistance information updating the status of the UE to measure all of the bands in the set of bands without a measurement gap.

The following numbered clauses provide an overview of aspects of the present disclosure:

Clause 1. A method of wireless communications at a user equipment (UE), the method comprising: receiving an enquiry for capabilities of the UE with respect to a set of bands; determining a portion of the set of bands that can be measured without a measurement gap; indicating a status of the UE to measure all of the bands in the set of bands without a measurement gap when the portion of the set of bands is greater than a first threshold or connected mode discontinuous reception (CDRX) is configured; receiving a configuration for inter-band measurements without a measurement gap; and transmitting a measurement report for inter-band measurements without a measurement for one or more bands that the UE cannot measure without a measurement gap.

Clause 2. The method of clause 1, wherein the UE cannot measure at least one band in the set of bands without a measurement gap.

Clause 3. The method of clause 1, further comprising performing a gapless measurement on the portion of the set of bands.

Clause 4. The method of clause 1, wherein determining the portion of the set of bands that can be measured without a measurement gap comprises determining that each band in the set of bands that can be measured without a measurement gap is in an advertised band combination with a band of a primary cell.

Clause 5. The method of clause 1, wherein determining the portion of the set of bands that can be measured without a measurement gap comprises determining that one or more bands that cannot be measured without a measurement gap is included in the portion of the set of bands that can be measured without a measurement gap when a record of previously acquired cells indicates no cells in the one or more bands that cannot be measured without a measurement gap.

Clause 6. The method of clause 5, wherein the portion of the set of bands that can be measured without a measurement gap is less than the first threshold but greater than a second threshold, and the portion of the set of bands that can be measured without a measurement gap plus the one or more bands that cannot be measured without a measurement gap without a record of previously acquired cells is greater than the first threshold.

Clause 7. The method of clause 1, further comprising performing a measurement of one or more bands which the UE cannot measure without a measurement gap during an off portion of a CDRX cycle.

Clause 8. The method of clause 1, further comprising transmitting UE assistance information updating the capability of the UE to measure all of the bands in the set of bands without a measurement gap.

Clause 9. The method of clause 1, wherein indicating the status of the UE is based on a power saving mode or a low mobility mode.

Clause 10. An apparatus for wireless communications at a user equipment (UE), comprising: one or more memories, individually or in combination, storing computer-executable instructions; and one or more processors, individually or in combination, configured to execute the instructions to: receive an enquiry for capabilities of the UE with respect to a set of bands; determine a portion of the set of bands that can be measured without a measurement gap; indicate a status of the UE to measure all of the bands in the set of bands without a measurement gap when the portion of the set of bands is greater than a first threshold or connected mode discontinuous reception (CDRX) is configured; receive a configuration for inter-band measurements without a measurement gap; and transmit a measurement report for inter-band measurements without a measurement for one or more bands that the UE cannot measure without a measurement gap.

Clause 11. The apparatus of clause 10, wherein the UE cannot measure at least one band in the set of bands without a measurement gap.

Clause 12. The apparatus of clause 10, wherein the one or more processors, individually or in combination, are configured to perform a gapless measurement on the portion of the set of bands.

Clause 13. The apparatus of clause 10, wherein to determine the portion of the set of bands that can be measured without a measurement gap, the one or more processors, individually or in combination, are configured to determine that each band in the set of bands that can be measured without a measurement gap is in an advertised band combination with a band of a primary cell.

Clause 14. The apparatus of clause 10, wherein to determine the portion of the set of bands that can be measured without a measurement gap, the one or more processors, individually or in combination, are configured to determine that one or more bands that cannot be measured without a measurement gap is included in the portion of the set of bands that can be measured without a measurement gap when a record of previously acquired cells indicates no cells in the one or more bands that cannot be measured without a measurement gap.

Clause 15. The apparatus of clause 14, wherein the portion of the set of bands that can be measured without a measurement gap is less than the first threshold but greater than a second threshold, and the portion of the set of bands that can be measured without a measurement gap plus the one or more bands that cannot be measured without a measurement gap without a record of previously acquired cells is greater than the first threshold.

Clause 16. The apparatus of clause 10, wherein the one or more processors, individually or in combination, are configured to perform a measurement of one or more bands which the UE cannot measure without a measurement gap during an off portion of a CDRX cycle.

Clause 17. The apparatus of clause 10, wherein the one or more processors, individually or in combination, are configured to transmit UE assistance information updating the capability of the UE to measure all of the bands in the set of bands without a measurement gap.

Clause 18. The apparatus of clause 10, wherein the indication of the status of the UE is based on a power saving mode or a low mobility mode.

Clause 19. An apparatus for wireless communications at a user equipment (UE), the apparatus comprising: means for receiving an enquiry for capabilities of the UE with respect to a set of bands; means for determining a portion of the set of bands that can be measured without a measurement gap; means for indicating a status of the UE to measure all of the bands in the set of bands without a measurement gap when the portion of the set of bands is greater than a first threshold or connected mode discontinuous reception (CDRX) is configured; means for receiving a configuration for inter-band measurements without a measurement gap; and means for transmitting a measurement report for inter-band measurements without a measurement for one or more bands that the UE cannot measure without a measurement gap.

Clause 20. The apparatus of clause 19, wherein the UE cannot measure at least one band in the set of bands without a measurement gap.

Clause 21. The apparatus of clause 19, further comprising means for performing a gapless measurement on the portion of the set of bands.

Clause 22. The apparatus of clause 19, wherein the means for determining the portion of the set of bands that can be measured without a measurement gap is configured to determine that each band in the set of bands that can be measured without a measurement gap is in an advertised band combination with a band of a primary cell.

Clause 23. The apparatus of clause 19, wherein the means for determining the portion of the set of bands that can be measured without a measurement gap is configured to determine that one or more bands that cannot be measured without a measurement gap is included in the portion of the set of bands that can be measured without a measurement gap when a record of previously acquired cells indicates no cells in the one or more bands that cannot be measured without a measurement gap.

Clause 24. The apparatus of clause 23, wherein the portion of the set of bands that can be measured without a measurement gap is less than the first threshold but greater than a second threshold, and the portion of the set of bands that can be measured without a measurement gap plus the one or more bands that cannot be measured without a measurement gap without a record of previously acquired cells is greater than the first threshold.

Clause 25. The apparatus of clause 19, further comprising means for performing a measurement of one or more bands which the UE cannot measure without a measurement gap during an off portion of a CDRX cycle.

Clause 26. The apparatus of clause 19, further comprising means for transmitting UE assistance information updating the capability of the UE to measure all of the bands in the set of bands without a measurement gap.

Clause 27. The apparatus of clause 19, wherein the means for indicating the status of the UE is configured to indicate the status based on a power saving mode or a low mobility mode.

Clause 28. A non-transitory computer-readable medium storing computer-executable instructions that when executed by one or more processors of a user equipment (UE) cause the UE to: receive an enquiry for capabilities of the UE with respect to a set of bands; determine a portion of the set of bands that can be measured without a measurement gap; indicate a status of the UE to measure all of the bands in the set of bands without a measurement gap when the portion of the set of bands is greater than a first threshold or connected mode discontinuous reception (CDRX) is configured; receive a configuration for inter-band measurements without a measurement gap; and transmit a measurement report for inter-band measurements without a measurement for one or more bands that the UE cannot measure without a measurement gap.

Clause 29. The non-transitory computer-readable medium of clause 28, wherein the instructions to determine a portion of the set of bands that can be measured without a measurement gap comprise instructions to determine that each band in the set of bands that can be measured without a measurement gap is in an advertised band combination with a band of a primary cell.

Clause 30. The non-transitory computer-readable medium of clause 28, wherein the instructions to determine a portion of the set of bands that can be measured without a measurement gap comprise instructions to determine that one or more bands that cannot be measured without a measurement gap is included in the portion of the set of bands that can be measured without a measurement gap when a record of previously acquired cells indicates no cells in the one or more bands that cannot be measured without a measurement gap. As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communications at a user equipment (UE), the method comprising:
   receiving an enquiry for capabilities of the UE with respect to a set of bands;
   determining a portion of the set of bands that can be measured without a measurement gap;
   indicating a status of the UE to measure all of the bands in the set of bands without a measurement gap in response to the portion of the set of bands being greater than a first threshold or connected mode discontinuous reception (CDRX) being configured;

receiving a configuration for inter-band measurements without a measurement gap; and transmitting a measurement report for inter-band measurements without a measurement for one or more bands in the configuration for inter-band measurements that the UE cannot measure without a measurement gap.

2. The method of claim 1, wherein the UE cannot measure at least one band in the set of bands without a measurement gap.

3. The method of claim 1, further comprising performing a gapless measurement on the portion of the set of bands.

4. The method of claim 1, wherein determining the portion of the set of bands that can be measured without a measurement gap comprises determining that each band in the set of bands that can be measured without a measurement gap is in an advertised band combination with a band of a primary cell.

5. The method of claim 1, wherein determining the portion of the set of bands that can be measured without a measurement gap comprises determining that one or more bands that cannot be measured without a measurement gap is included in the portion of the set of bands that can be measured without a measurement gap when a record of previously acquired cells indicates no cells in the one or more bands that cannot be measured without a measurement gap.

6. The method of claim 5, wherein the portion of the set of bands that can be measured without a measurement gap is less than the first threshold but greater than a second threshold, and the portion of the set of bands that can be measured without a measurement gap plus the one or more bands that cannot be measured without a measurement gap without a record of previously acquired cells is greater than the first threshold.

7. The method of claim 1, further comprising performing a measurement of one or more bands which the UE cannot measure without a measurement gap during an off portion of a CDRX cycle.

8. The method of claim 1, further comprising transmitting UE assistance information updating the capability of the UE to measure all of the bands in the set of bands without a measurement gap.

9. The method of claim 1, wherein indicating the status of the UE is based on a power saving mode or a low mobility mode.

10. An apparatus for wireless communications at a user equipment (UE), comprising:

one or more memories, individually or in combination, storing computer-executable instructions; and one or more processors, individually or in combination, configured to execute the instructions to:

receive an enquiry for capabilities of the UE with respect to a set of bands;

determine a portion of the set of bands that can be measured without a measurement gap;

indicate a status of the UE to measure all of the bands in the set of bands without a measurement gap in response to the portion of the set of bands being greater than a first threshold or connected mode discontinuous reception (CDRX) being configured;

receive a configuration for inter-band measurements without a measurement gap; and transmit a measurement report for inter-band measurements without a measurement for one or more bands in the configuration for inter-band measurements that the UE cannot measure without a measurement gap.

11. The apparatus of claim 10, wherein the UE cannot measure at least one band in the set of bands without a measurement gap.

12. The apparatus of claim 10, wherein the one or more processors, individually or in combination, are configured to perform a gapless measurement on the portion of the set of bands.

13. The apparatus of claim 10, wherein to determine the portion of the set of bands that can be measured without a measurement gap, the one or more processors, individually or in combination, are configured to determine that each band in the set of bands that can be measured without a measurement gap is in an advertised band combination with a band of a primary cell.

14. The apparatus of claim 10, wherein to determine the portion of the set of bands that can be measured without a measurement gap, the one or more processors, individually or in combination, are configured to determine that one or more bands that cannot be measured without a measurement gap is included in the portion of the set of bands that can be measured without a measurement gap when a record of previously acquired cells indicates no cells in the one or more bands that cannot be measured without a measurement gap.

15. The apparatus of claim 14, wherein the portion of the set of bands that can be measured without a measurement gap is less than the first threshold but greater than a second threshold, and the portion of the set of bands that can be measured without a measurement gap plus the one or more bands that cannot be measured without a measurement gap without a record of previously acquired cells is greater than the first threshold.

16. The apparatus of claim 10, wherein the one or more processors, individually or in combination, are configured to perform a measurement of one or more bands which the UE cannot measure without a measurement gap during an off portion of a CDRX cycle.

17. The apparatus of claim 10, wherein the one or more processors, individually or in combination, are configured to transmit UE assistance information updating the status of the UE to measure all of the bands in the set of bands without a measurement gap.

18. The apparatus of claim 10, wherein the indication of the status of the UE is based on a power saving mode or a low mobility mode.

19. An apparatus for wireless communications at a user equipment (UE), the apparatus comprising:

means for receiving an enquiry for capabilities of the UE with respect to a set of bands;

means for determining a portion of the set of bands that can be measured without a measurement gap;

means for indicating a status of the UE to measure all of the bands in the set of bands without a measurement gap in response to the portion of the set of bands being greater than a first threshold or connected mode discontinuous reception (CDRX) being configured;

means for receiving a configuration for inter-band measurements without a measurement gap; and means for transmitting a measurement report for inter-band measurements without a measurement for one or more bands in the configuration for inter-band measurements that the UE cannot measure without a measurement gap.

20. The apparatus of claim 19, wherein the UE cannot measure at least one band in the set of bands without a measurement gap.

21. The apparatus of claim 19, further comprising means for performing a gapless measurement on the portion of the set of bands.

22. The apparatus of claim 19, wherein the means for determining the portion of the set of bands that can be measured without a measurement gap is configured to determine that each band in the set of bands that can be measured without a measurement gap is in an advertised band combination with a band of a primary cell.

23. The apparatus of claim 19, wherein the means for determining the portion of the set of bands that can be measured without a measurement gap is configured to determine that one or more bands that cannot be measured without a measurement gap is included in the portion of the set of bands that can be measured without a measurement gap when a record of previously acquired cells indicates no cells in the one or more bands that cannot be measured without a measurement gap.

24. The apparatus of claim 23, wherein the portion of the set of bands that can be measured without a measurement gap is less than the first threshold but greater than a second threshold, and the portion of the set of bands that can be measured without a measurement gap plus the one or more bands that cannot be measured without a measurement gap without a record of previously acquired cells is greater than the first threshold.

25. The apparatus of claim 19, further comprising means for performing a measurement of one or more bands which the UE cannot measure without a measurement gap during an off portion of a CDRX cycle.

26. The apparatus of claim 19, further comprising means for transmitting UE assistance information updating the capability of the UE to measure all of the bands in the set of bands without a measurement gap.

27. The apparatus of claim 19, wherein the means for indicating the status of the UE is configured to indicate the status based on a power saving mode or a low mobility mode.

28. A non-transitory computer-readable medium storing computer-executable instructions that when executed by one or more processors of a user equipment (UE) cause the UE to:

receive an enquiry for capabilities of the UE with respect to a set of bands;

determine a portion of the set of bands that can be measured without a measurement gap;

indicate a status of the UE to measure all of the bands in the set of bands without a measurement gap in response to the portion of the set of bands being greater than a first threshold or connected mode discontinuous reception (CDRX) being configured;

receive a configuration for inter-band measurements without a measurement gap; and transmit a measurement report for inter-band measurements without a measurement for one or more bands in the configuration for inter-band measurements that the UE cannot measure without a measurement gap.

29. The non-transitory computer-readable medium of claim 28, wherein the instructions to determine a portion of the set of bands that can be measured without a measurement gap comprise instructions to determine that each band in the set of bands that can be measured without a measurement gap is in an advertised band combination with a band of a primary cell.

30. The non-transitory computer-readable medium of claim 28, wherein the instructions to determine a portion of the set of bands that can be measured without a measurement gap comprise instructions to determine that one or more bands that cannot be measured without a measurement gap is included in the portion of the set of bands that can be measured without a measurement gap when a record of previously acquired cells indicates no cells in the one or more bands that cannot be measured without a measurement gap.

* * * * *